United States Patent [19]

Nichols, III et al.

[11] Patent Number: 4,685,022

[45] Date of Patent: Aug. 4, 1987

[54] GROUND FAULT CIRCUIT INTERRUPTER CAPABLE OF DERIVING ENERGY FROM GROUND FAULT CURRENT IN ORDER TO ACHIEVE CIRCUIT INTERRUPTION IN THE PRESENCE OF A REDUCED SUPPLY VOLTAGE

[75] Inventors: E. Lane Nichols, III, Clearwater; William P. Hooper, Largo; Kenneth J. Leynse, St. Petersburg, all of Fla.

[73] Assignee: Square D Company, Palatine, Ill.

[21] Appl. No.: 733,008

[22] Filed: May 10, 1985

[51] Int. Cl.[4] .............................................. H02H 3/16
[52] U.S. Cl. ........................................ 361/44; 361/42; 361/93
[58] Field of Search ................................. 361/42–50, 361/93, 102, 86

[56] References Cited

U.S. PATENT DOCUMENTS

| | | | |
|---|---|---|---|
| 3,978,400 | 8/1976 | Pettit | 361/44 |
| 4,205,358 | 5/1980 | Washington | 361/44 |
| 4,280,162 | 7/1981 | Tanka et al. | 361/45 |
| 4,542,432 | 9/1985 | Nichols, III et al. | 361/45 |

Primary Examiner—A. D. Pellinen
Assistant Examiner—Jeffrey A. Gaffin
Attorney, Agent, or Firm—A. Sidney Johnston; Donald P. Reynolds

[57] ABSTRACT

A ground-fault circuit interrupter is provided with an additional current-sensing element that responds to a net value of current through the power wires in an ac circuit. The winding may be wound on a ferromagnetic core of its own or it may be placed as a separate winding on a core that is used to sense imbalance in a GFCI. In the latter case the extra winding must be insulated electrically from the main sense winding. The additional coil is connected to a rectifying diode and a capacitor, so that an imbalance of current in the power wires charges the capacitor. The voltage thus developed across the capacitor is used to operate the tripping mechanism of the ground-fault circuit interrupter. The fault-powered signal thus attained in the added winding will enable the GFCI to operate despite the existence of heavy fault currents that reduce the operating voltage to the rest of the GFCI to a level that would otherwise prevent its operation.

12 Claims, 6 Drawing Figures

GROUND FAULT CIRCUIT INTERRUPTER CAPABLE OF DERIVING ENERGY FROM GROUND FAULT CURRENT IN ORDER TO ACHIEVE CIRCUIT INTERRUPTION IN THE PRESENCE OF A REDUCED SUPPLY VOLTAGE

BACKGROUND OF THE INVENTION

This invention relates to ground-fault circuit interrupters (GFCIs), also referred to as earth-leakage circuit breakers. In particular, it is an improvement that is applicable to a number of different types of GFCIs.

A ground-fault circuit interrupter is a device that detects a departure from zero net current through two or more wires and opens the circuit or circuits that supply electric power to those wires. Such an imbalance normally means that one or more of the wires in the circuit has established a second connection to ground, permitting some current to return to the source through a path other than one of the wires in question. The sensing means is typically a toroidal transformer, the primary of which is one or a few turns of the wires in which the imbalance is to be sensed. A secondary coil, typically of hundreds of turns, generates an output in response to an imbalance of current.

An additional feature of ground-fault circuit interrupters that are available in the United States is a means of detecting a grounded neutral line. This is a requirement of Underwriters' Laboratories (UL) and the Canadian Standards Association (CSA) for their listings of a ground-fault circuit interrupter, but is not required by the various European standards. The detection of a grounded neutral is normally accomplished by some form of a dormant oscillator. This is a circuit that exhibits positive feedback that is switched off except when the neutral line is grounded at a location downstream from the GFCI. When such a ground is applied to the neutral line, oscillations build up, generating a signal that is treated the same as a current imbalance signal to cause interruption of power to the circuit.

Standards currently applicable to GFCIs call for the circuit to have no response at a detected imbalance current below some minimum value. This provides a window for discrimination against false trips caused by electrical noise on the line. A GFCI should trip upon detection of the minimum current for a stated time. The trip time becomes faster as the current increases. These and other aspects of the operation of GFCIs are discussed at length in U.S. Pat. No. 4,263,637, and in allowed U.S. application Ser. No. 06/412,454, filed Aug. 27, 1982, and now U.S. Pat. No. 4,542,432, both of which are incorporated by reference here as if set forth fully.

It can be seen from both the patent and the allowed patent application cited above that the operation of a GFCI is dependent upon the operation of an electronic circuit. An electronic circuit, in turn, requires electric power for its operation. That power is typically derived from the lines that are protected. A problem can arise in the operation of a GFCI when a short circuit or a heavy overload reduces the line voltage and thus reduces the operating voltage to the electronic circuit. In some countries, standards are applied to specify a minimum line voltage at which a GFCI must operate. A typical standard of this type calls for reliable operation of the GFCI when the voltage of a 220-volt circuit is reduced to twenty percent of its nominal value or 44 volts. It should be recalled that a 220-volt device is typically required to be designed to operate within 20% of its nominal operating voltage. This means that such a GFCI must operate over a much larger range of voltages, from 44 volts to 264 volts. Such a range places extreme demands upon the design of a GFCI.

SUMMARY OF THE INVENTION

It is an object of the invention to provide an improved ground-fault circuit interrupter (GFCI).

It is a further object of the invention to provide a fault-powered tripping signal for a GFCI.

It is a further object of the present invention to provide an improvement in a ground-fault circuit interrupter that permits the GFCI to respond to a short circuit that causes the GFCI to function with a reduced operating voltage.

It is a further object of the present invention to provide a fault-powered tripping circuit to supplement the operation of a GFCI.

These and other objects will become apparent in the course of a detailed description of the invention.

A ground-fault circuit interrupter is provided with an additional current-sensing element that responds to a net value of current through the power wires in an ac circuit. The winding may be wound on a ferromagnetic core of its own or it may be placed as a separate winding on a core that is used to sense imbalance in a GFCI. In the latter case the extra winding is normally insulated electrically from the main sense winding. The additional coil is connected to a rectifying diode and a capacitor, so that an imbalance of current in the power wires charges the capacitor. The voltage thus developed across the capacitor is used to operate the tripping mechanism of the ground-fault circuit interruptor. The fault-powered signal thus attained in the added winding will enable the GFCI to operate despite the existence of heavy fault currents that reduce the operating voltage to the rest of the GFCI to a level that would otherwise prevent its operation.

DETAILED DESCRIPTION OF THE PREFERRED EMBODIMENT

Figure 1:
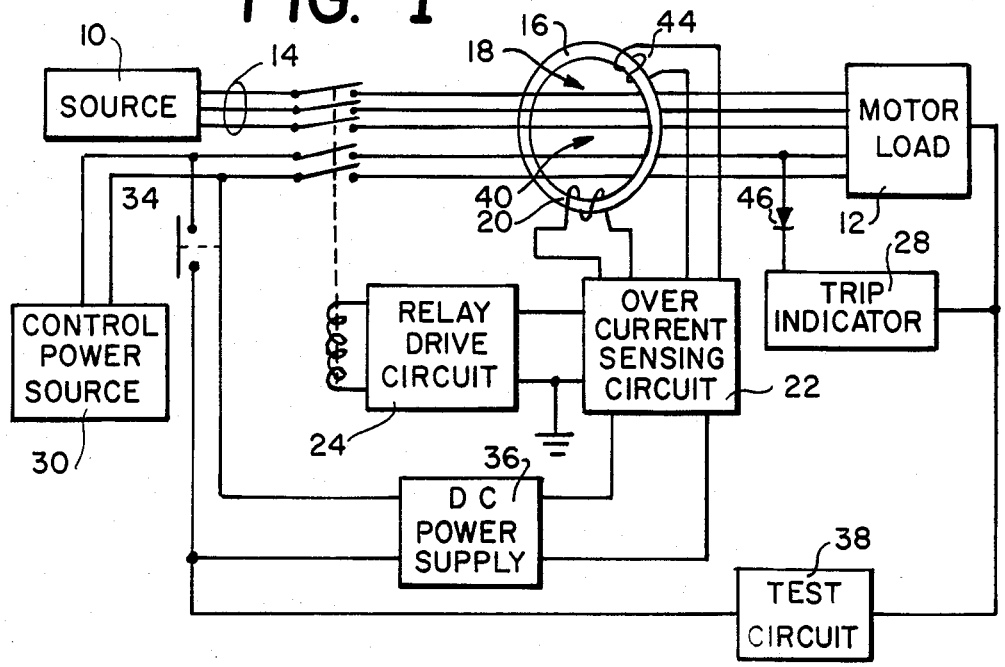
FIG. 1 is an overall block diagram of a circuit for the practice of the present invention.

FIG. 1 is a block diagram of a circuit for the practice of the present invention. In FIG. 1 a source 10 of electric power is connected to a load 12 by wires 14. FIG. 1 shows three wires 14 which is characteristic of the typical connection of a three-phase source to a load such as a three-phase motor. This represents one of a number of embodiments, all of which can be used in the practice of the present invention. Thus, wires 14 represent the current carriers for a three-phase load without a ground. They might represent the four wires of a three-phase load with a ground. They might represent the two wires of an ungrounded single-phase load, or they might also represent the three wires of a single-phase load with a ground wire. Any of these possibilities is equally well adapted for the practice of the present invention.

Wires 14 pass through a ferromagnetic core 16, constituting a one-turn primary of a transformer 18 for which coil 20 is a secondary. Transformer 18 will develop a voltage across coil 20 only when there is a non-zero net current flowing in wires 14. Such an imbalance indicates that there is a ground fault on the load side of transformer 16 so that some current is returning to source 10 by a path that does not go through transformer 18. Such sensing is typical of many ground-fault circuit interrupters.

Transformer 18 is connected to overcurrent sensing circuit 22 which generates a signal in response to an imbalance of current in wires 14. The output of overcurrent sensing circuit 22 is taken to relay drive circuit 24 to open contacts 26. In addition to interrupting power to load 12 by controlling a circuit inside load 12, this also interrupts power trip indicator 28. In the alternative, contacts 26 might interrupt wires 14 at a location corresponding to that of the contacts 26 shown in FIG. 1. For relatively large loads, it is more common to have the fault trip mechanism in load 12 as shown.

Power to operate the circuit of FIG. 1 is shown there as coming from control source 30. While in FIG. 1 control source 30 is shown as separate from source 10, it should be evident that one way of achieving control source 30 is by means of a transformer on source 10 or one of its phases. In FIG. 1 power from control source 30 is shown as passing through contractors 26 and core 16 through wires 32 to supply power to trip indicator 28. Wires 32 are also shown here as connected to load 12. This is not necessary but is commonly done to supply power to operate a contactor that controls power to large loads.

Power from source 30 also passes through switch 34, a normally closed switch to dc power supply 36. Switch 34 is a reset switch to reset trip indicator 28 after a fault or a test. DC power supply 36 is connected to overcurrent sensing circuit 22 to supply operating voltages. Power from source 30 is also taken through switch 34 to test circuit 38 which is connected to trip indicator 28 and load 12 to provide a means of simulating a fault to test operation of the circuit.

Figure 2A:
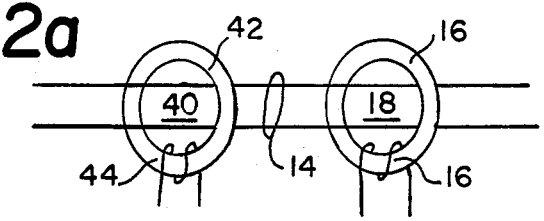
FIG. 2a is a circuit diagram of an alternative method of connecting the sensors of FIG. 1.
Figure 2B:
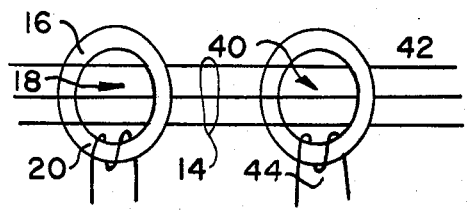
FIG. 2b is a circuit diagram of a second alternative method of connecting the sensors of FIG. 1.
Figure 2C:
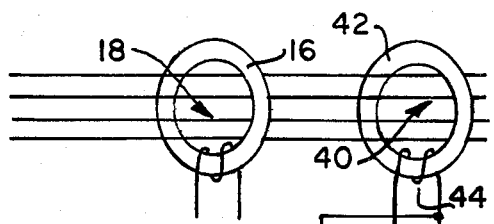
FIG. 2c is a circuit diagram of a third alternative method of connecting the sensors of FIG. 1.
Figure 2D:
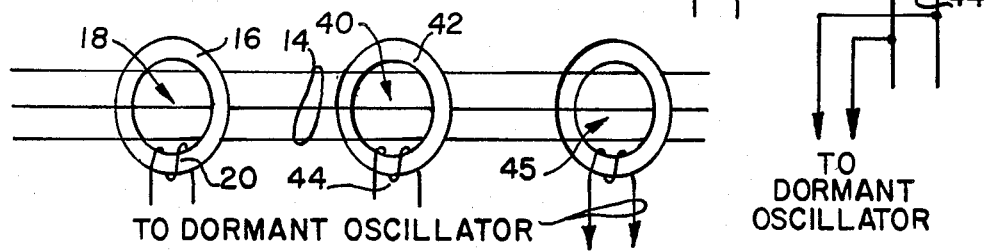
FIG. 2d is a circuit diagram of a fourth alternative method of connecting the sensors of FIG. 1.

The elements described above in FIG. 1 are typical of a number of ground-fault circuit interruptors. The present invention adds a transformer 40 which consists of a coil 44 on ferromagnetic core 16 that encloses wires 14. Coil 44 is thus linked to wires 32. This is a matter of design choice. It would be equally feasible to have coil 44 on a separate core 42, comprising a separate transformer 40. Transformers 18 and 40 might enclose only wires 14 that carry power to load 12 and one might protect wires 32 by a separate GFCI or else operate them without protection against ground faults. Several alternative arrangements are shown in FIG. 2. In FIG. 2a, the two wires 14 of a single-phase circuit are protected by separate transformers 18 and 40, and transformer 40 is closer to the source. In FIG. 2b, wires 14 may be an ungrounded three-phase system or a single-phase system with a ground, and transformer 18 is closer to the source. In FIG. 2c, wires 14 may represent a grounded three-phase system, and transformer 40 is placed a distance downstream of transformer 18 so that transformer 40 also provides a signal for a dormant oscillator. In FIG. 2d, the wires 14 of a grounded single-phase circuit are coupled to separate transformers 16 and 42 and also to a third transformer 45 that functions exclusively as part of a dormant-oscillator circuit. Wires 14 comprise the primary of transformer 40.

In FIG. 1, coil 44 is connected through diode 46 to over current sensing circuit 22. An imbalance signal detected by transformer 40 provides the operation at a different level which is a feature of the present invention.

Figure 3:
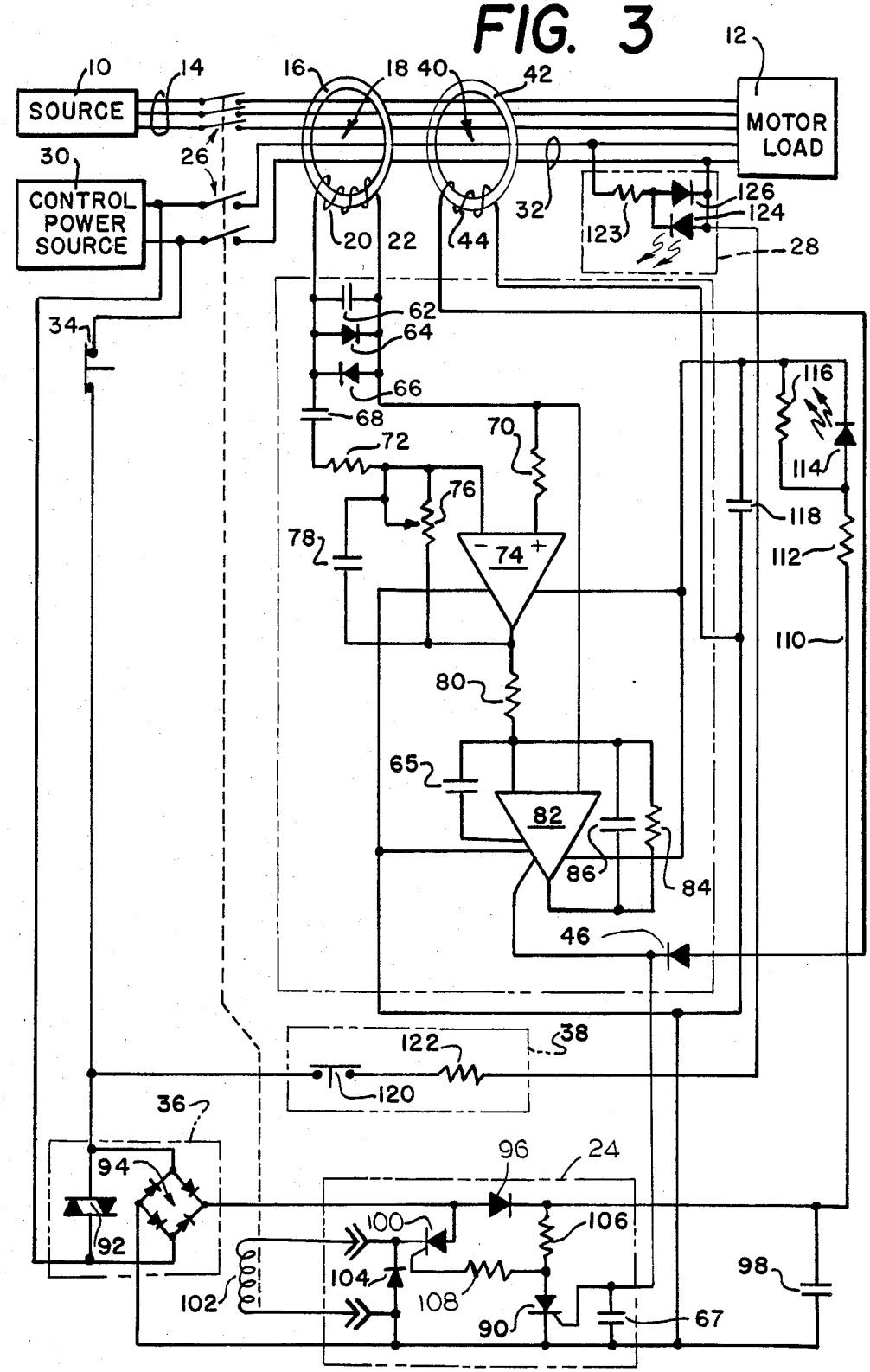
FIG. 3 is a detailed circuit diagram of a circuit for the practice of the present invention.

FIG. 3 is a detailed circuit diagram of the circuit of FIG. 1. In FIG. 3, the first elements to be described could be those of a number of ground-fault circuit interrupters, including those described above. The particular circuit described next is that of U.S. application Ser. No. 412,454, "Ground Fault Detection Circuit," which stands allowed. Thus, in FIG. 3 coil 20 is paralleled by capacitor 62 and diodes 64 and 66. Diodes 64 and 66 are placed with opposite plurality to limit the amount of voltage developed across coil 20. Capacitor 62 reduces voltage peaks that are applied to diode 64 and 66.

Coil 20 is connected through a capacitor 68 and resistors 70 and 72 to an amplifier 74. The inherent inductance of coil 20 combines with the capacitance of capacitor 68 and the resistance of resistors 70 and 72 to form a series RLC circuit as taught in application Ser. No. 412,454. An adjustable resistor 76 in parallel with capacitor 78 is connected to apply negative feedback to amplifier 74.

The output of amplifier 74 is applied through a resistor 80 to the negative input terminal of an integrated circuit 82. An input to the positive terminal of integrated circuit 82 is taken from one side of coil 20. Resistor 84, capacitor 86, and capacitor 65 provide negative feedback around integrated circuit 82 and also filtering of unwanted signals.

Normal operation of the circuit of FIG. 3 comprises detecting an imbalanced current in transformer 18. The resulting signal is taken through operational amplifier 74 and integrated circuit 82 through lead 88 to trigger SCR 90. Power for both overcurrent sensing circuit 22 and relay drive circuit 24 is taken from control source 30 through switch 34, a reset switch, to DC power supply 36. This includes a MOV 92 which is connected across a rectifier bridge 94. Power from rectifier 94 is taken to diode 96 and is filtered by capacitor 98. The rectified output of rectifier bridge is applied through SCR 100 to drive normally energized relay coil 102. The contacts 26 of energized relay coil 102 will supply power to load 12. SCR 100 is triggered on each half cycle of the AC line voltage by current flow through resistors 106 and 108. The triggering signal is derived from the filtered voltage across capacitor 98, a relatively constant DC value. The unfiltered rectified output of bridge 94 is applied across the series combination of SCR 100 and relay coil 102 whenever switch 34 is closed to apply power from control source 30. Upon application of a fault, of sufficient magnitude, SCR 90 will turnon and inhibit turnon of SCR 100 on the next half-cycle. Capacitor 67 filters the input to SCR 90 and prevents false tripping on noise signals. Snubber diode 104 is placed across relay coil 102 to prevent the development of relatively high voltages when the current through SCR 100 is interrupted.

The filtered DC voltage across capacitor 98 is taken on lead 110 to supply operating voltages to operational amplifier 74 and custom amplifier, level detector integrated circuit 82. This might be done in a number of ways. The way shown here is to apply the operating voltage through resistor 112 and light-emitting diode (LED) 114. A bypass resistor 116 renders the circuit operative by supplying current to operational amplifier 74 and integrated circuit 82 in the event of a failure of LED 114, which functions as an indicator that the circuit is on. An additional filter capacitor 118 may be used, as shown, to supply extra filtering to the DC voltage.

Test circuit 38 comprises a normally open switch 120 which is connected through resistor 122 to one of wires 32. This tests the operation of the circuit of FIG. 3 by creating an imbalance in the current through transformer 18, causing relay coil 102 to open the circuit. When the circuit is not tripped, power will flow through resistor 123 and LED 124 to give a visual indication that the circuit is on. When LED 124 is off the circuit has been tripped. Diode 126 is placed across LED 124 to hold its reverse voltage to an acceptable value.

To reiterate, normal operation of the GFCI of FIG. 3 involves the development of a signal in coil 20 that is coupled through operational amplifier 74 and integrated circuit 82 to trip SCR 90 and remove power to relay coil 102. Coil 20 is sized so that along with the other components of a circuit it will generate a tripping signal in response to a specified imbalance. However, if that imbalance of current is associated with a short circuit that reduces voltage at control source 30, operational amplifier 74 and integrated circuit 82 may be rendered inoperative by a reduced voltage. This is the point at which the improvement of the present invention becomes operative. Transformer 40 develops a signal across coil 44 that is rectified by diode 46 and applied to the gate of SCR 90 directly. Both SCR 90 and SCR 100 can be triggered into conduction with relatively low anode voltages. Once this is done the only limit on the function of the circuit of FIG. 3 in case of a fault is that rectifier bridge 94 supply enough current through SCR 90 to de-energize relay coil 102 and open contacts 26. Since the signal supplied by transformer 40 bypasses operational amplifier 74 and integrated circuit 82 to operate SCR 90 directly, it is appropriate to refer to its effect as being a fault-powered trip.

It should be evident that such an effect could have been achieved in other ways. For example, coil 44 could have been connected through diode 46 to the gate SCR 100 to trigger it. In the alternative, coil 44 could have been connected through diode 46 to go directly across diode 104 so that relay coil 102 was powered exclusively by energy from transformer 40. Operation of relay coil 102 will unlatch a latched relay, permitting normally closed contacts 26 to open. It would also have been possible to combine the modes of operation just described so that coil 44 is used both to trigger SCR 100 as shown in FIG. 3 and is also connected to drive relay coil 102 directly. Such a combination would cover a wider range of ground faults and might be caused to operate over a wider range of short circuits with consequent reductions in linevoltage. In any event the preferred embodiment to meet European standards is that of FIG. 3. Its equivalent to meet standards in the United States and Canada is the embodiment of FIG. 3 together with a feedback coil for the dormant oscillator as shown in FIGS. 2c and 2d.

The circuit of FIG. 3 has been built and tested. Values for components are listed in the table by the element numbers of FIGS. 1–3.

TABLE

Element Values in FIGS. 1–3

| RESISTORS | | CAPACITORS | | |
|---|---|---|---|---|
| 70 | 1K | 62 | 0.02 | Microfarads |
| 72 | 1K | 65 | 0.001 | Microfarads |
| 76 | 1 M | 67 | 10 | Microfarads |
| 80 | 27K | 68 | 10 | Microfarads |
| 84 | 68K | 78 | 0.001 | Microfarads |
| 112 | 12K, 1 W | 86 | 0.0022 | Microfarads |
| 116 | 1K | 98 | 0.22 | Microfarads |
| 122 | 24K ½ W | 118 | 6.8 | Microfarads |

TRANSFORMERS
16 Ferrite Toroidal Core
42 Ferrite Toroidal Core
20 Transformer Coil, 1400 Turns
44 Transformer Coil, 250 Turns DIODES
46 1N4004
64 1N4004
66 1N4004
114 Light-Emitting Diode
124 Light-Emitting Diode
126 1N4004

OTHERS
74 General-Purpose Operational Amplifier
82 Analog Custom I.C.; Includes OP-AMP, Level Detectors and Shunt Regulator
90 Silicon-Controlled Rectifier
92 Metal Oxide Varistor
94 Silicon Bridge Rectifier
100 Silicon-Controlled Rectifier
102 Trip Coil

We claim:

1. A ground-fault circuit interrupter interrupting the supply of electrical energy from a source to a load upon the occurrence of fault to ground, the interrupter comprising:

first sensing means for detecting an imbalance of current in electrical conductors carrying power between the source and the load;

electrical circuit means connected to the first sensing means and responsive to a signal from the first sensing means to interrupt power to the load in response to a signal from the first sensing means; and second sensing means responsive to a ground fault in the source to the load, the second sensing means capable of supplying power provided by a ground fault current to the electronic circuit to cause operation of the electronic circuit regardless of the presence of a reduced supply voltage to the electronic circuit.

2. The circuit of claim 1 wherein the first sensor comprises a core of ferromagnetic material enclosing conductors carrying current to the load and a coil wound on the core to produce a signal in response to an imbalance in AC current through the core; and wherein the second sensing means comprises a second coil wound on the core and insulated electrically from the first coil.

3. The circuit of claim 1 wherein the first sensor comprises a first ferromagnetic core disposed to enclose all conductors normally carrying current to the load and a first coil wound on the core and coupled magnetically to the core; and wherein the second sensor comprises a second core coupled magnetically to the load current and a second coil wound on the second core and coupled magnetically to the second core.

4. The circuit of claim 3 comprising in addition:

a third ferromagnetic core disposed to enclose load current, the third ferromagnetic core disposed at a distance from the first sensor; and a third coil wound on the third core and coupled magnetically to the third core, the third coil connected to the electronic circuit so as to provide positive feedback in the event of a grounded neutral;

5. The circuit of claim 1 comprising in addition:

a control power source;

a DC power supply connected to the control source and to the electronic circuit to supply DC power to the electronic circuit; and a relay drive circuit connected to the electronic circuit and to plurality of contacts to effect an interruption of AC power to the load.

6. The circuit of claim 5 comprising in addition a trip indicator to indicate that a ground fault has been detected and power has been interrupted.

7. The circuit of claim 5 comprising in addition means for testing the circuit by simulating a ground fault.

8. A ground-fault circuit interrupter interrupting the supply of electrical energy from a source to a load upon the occurrence of a fault to ground, the interrupter comprising:

first sensing means for detecting an imbalance of current in electrical conductors carrying power between the source and the load;

electrical circuit means connected to the first sensing means and responsive to a signal from the first sensing means to interrupt power to the load in response to a signal from the first sensing means; and second sensing means responsive to a ground fault in the source to the load, the second sensing means capable of supplying power derived from the ground fault current for operation of the electronic circuit regardless of the presence of a reduced supply voltage to the electronic circuit.

9. The apparatus as in claim 8 further comprising:

said electric circuit means to interrupt power to the load having a relay for operating contacts in series between the source and said load, said relay operable by energization of a relay coil;

said second sensing means is a core of ferromagnetic material enclosing conductors carrying current to the load and a coil wound on the core to produce an electric current in response to an imbalance in AC current to the core;

means, responsive to said electric current produced by said coil wound on said ferromagnetic core of said second sensing means, for disconnecting an energization current to said relay in order to interrupt said supply of electrical energy from said source to said load.

10. The apparatus as in claim 9 wherein said means for disconnecting an energization current to said relay further comprises:

a first electronic switch for controlling current to said relay coil;

a second electronic switch, operable by said electric current produced by said coil wound on said ferromagnetic material, for turning off said first electronic switch in order to disconnect said energization current to said relay and thereby open said contacts and interrupt the supply of electrical energy to said load.

11. The apparatus as in claim 10 wherein said means for disconnecting an energization current to said relay further comprises:

said first electronic switch is a first thyristor for controlling said energization current to said relay;

said second electronic switch is a second thyristor for turning off said first thyristor, said second thyristor having a control element driven by current provided by said coil wound on said core of said second sensing means, said current induced by current flow through said sensing means as a result of a ground fault.

12. A ground fault circuit interrupter interrupting the supply of electrical energy from a source to a load upon the occurrence of a fault to ground, the interrupter comprising:

first sensing means for detecting an imbalance of current in electrical conductors carrying power between the source and the load;

a relay for operating contacts in series between the supply of electrical energy and said load, said relay operable by energization of a relay coil;

means, responsive to said first sensing means, for de-energizing said relay coil in the event that said first sensing means detects said imbalance of current in electrical conductors carrying power between the source and the load;

a first thyristor for controlling current flow to said relay coil, a second sense coil capable of having a current induced therein by an imbalance of current in electrical conductors carrying power between the source and the load;

a second thyristor connected to extinguish conduction of said first thyristor when said second thyristor is in a conducting state, said second thyristor having a control element connected to said second sense coil, and said second thyristor capable of being driven into a conducting state by electric current flow between said second sense coil and said control element of said second thyristor, whereby a large fault to ground capable of reducing a supply voltage to the electronic circuit supplies current flow from said second sense coil to said second thyristor so as to de-energize said relay and interrupt the supply of electrical energy from said source to said load.

* * * * *